United States Patent
Yuan

(10) Patent No.: US 10,559,092 B2
(45) Date of Patent: Feb. 11, 2020

(54) METHOD AND DEVICE FOR PROCESSING WHITE BALANCE OF IMAGE AND STORAGE MEDIUM

(71) Applicant: GUANGDONG OPPO MOBILE TELECOMMUNICATIONS CORP., LTD., Dongguan, Guangdong (CN)

(72) Inventor: Quan Yuan, Dongguan (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 69 days.

(21) Appl. No.: 16/013,550

(22) Filed: Jun. 20, 2018

(65) Prior Publication Data

US 2019/0019312 A1 Jan. 17, 2019

(30) Foreign Application Priority Data

Jul. 12, 2017 (CN) .......................... 2017 1 0567012

(51) Int. Cl.
*G06T 7/90* (2017.01)
*H04N 1/64* (2006.01)
(Continued)

(52) U.S. Cl.
CPC ............ *G06T 7/90* (2017.01); *G06K 9/00288* (2013.01); *H04N 1/6077* (2013.01); *H04N 1/642* (2013.01);
(Continued)

(58) Field of Classification Search
CPC . G06T 7/90; G06T 2207/30201; G06T 5/009; H04N 1/642; H04N 1/6077;
(Continued)

(56) References Cited

U.S. PATENT DOCUMENTS 8,013,906 B2 9/2011 Ikeda
8,045,014 B2 10/2011 Fujiwara
(Continued)

FOREIGN PATENT DOCUMENTS

CN 101262617 A 9/2008
CN 101350883 A 1/2009
(Continued)

OTHER PUBLICATIONS

Supplementary European Search Report in European application No. 18181399.9, dated Nov. 27, 2018.
(Continued)

*Primary Examiner* — Amandeep Saini
(74) *Attorney, Agent, or Firm* — Ladas & Parry LLP

(57) ABSTRACT

A method and device for processing white balance of an image, and storage medium are provided. The method includes that: a first gain of an image is calculated according to a Face Automatic White Balance (FaceAWB) algorithm configured to regulate a face in the image to a skin color; a second gain for the image is calculated according to a simple gray world algorithm; whether the first gain is similar to the second gain is determined; and responsive to a determination that the first gain is similar to the second gain, white balance processing is performed on the image according to the second gain, and responsive to a determination that the first gain is not similar to the second gain, white balance processing is performed on the image according to the first gain.

20 Claims, 6 Drawing Sheets

(51) Int. Cl.
  *H04N 1/60* (2006.01)
  *H04N 9/73* (2006.01)
  *G06K 9/00* (2006.01)

(52) U.S. Cl.
  CPC ..... *H04N 9/73* (2013.01); *G06T 2207/30201* (2013.01); *H04N 9/735* (2013.01)

(58) Field of Classification Search
  CPC .......... H04N 9/73; H04N 9/735; H04N 5/243; G06K 9/00288
  USPC ........................................................ 382/118
  See application file for complete search history.

(56) References Cited

U.S. PATENT DOCUMENTS

| | | | |
|---|---|---|---|
| 8,310,561 B2 | 11/2012 | Misawa | |
| 8,514,297 B2 | 8/2013 | Ikeda | |
| 8,520,091 B2 | 8/2013 | Fujiwara | |
| RE46,232 E | 12/2016 | Takayama | |
| 2004/0208363 A1 | 10/2004 | Berge | |
| 2005/0122408 A1* | 6/2005 | Park | H04N 9/735 |
| | | | 348/223.1 |
| 2006/0284991 A1 | 12/2006 | Ikeda | |
| 2008/0211925 A1 | 9/2008 | Misawa | |
| 2009/0021602 A1* | 1/2009 | Fujiwara | H04N 5/23219 |
| | | | 348/223.1 |
| 2009/0067683 A1 | 3/2009 | Takayama | |
| 2010/0149420 A1 | 6/2010 | Zhang | |
| 2011/0205391 A1 | 8/2011 | Ikeda | |
| 2011/0234845 A1 | 9/2011 | Fujiwara | |
| 2017/0078636 A1* | 3/2017 | Cho | H04N 1/6027 |

FOREIGN PATENT DOCUMENTS

| | | |
|---|---|---|
| CN | 101472188 A | 7/2009 |
| CN | 101527860 A | 9/2009 |
| CN | 103139573 A | 6/2013 |
| CN | 104735362 A | 6/2015 |
| CN | 105407339 A | 3/2016 |
| CN | 106454285 A | 2/2017 |
| CN | 107454345 A | 12/2017 |
| EP | 1471747 A2 | 10/2004 |

OTHER PUBLICATIONS

International Search Report in international application No. PCT/CN2018/094903, dated Sep. 29, 2018.
Written Opinion of the International Search Authority in international application No. PCT/CN2018/094903, dated Sep. 29, 2018.

* cited by examiner

METHOD AND DEVICE FOR PROCESSING WHITE BALANCE OF IMAGE AND STORAGE MEDIUM

TECHNICAL FIELD

The present disclosure relates to the technical field of mobile terminals, and more particularly, to a method and device for processing white balance of an image and storage medium.

BACKGROUND

A human visual system has the characteristic of color constancy and may acquire a constant feature of a surface color of an object under a variable lighting environment and imaging condition. For example, no matter whether a white object is observed under an indoor tungsten lamp or the white object is observed under dark light, a human can perceive that the object is white. This is because that human brains have been adapted to colors of objects under different light in continuous growth processes of humans.

However, an imaging equipment has no such a regulation function and is required to select an algorithm for proper color balance to eliminate influence of a lighting environment on color presentation. In a related art, there are multiple white balance algorithms for calculating a gain and performing white balance processing on the basis of the gain. However, the specific algorithm to be adopted for calculation of the gain is usually selected by a user in a user setting manner in the related art.

SUMMARY

In an embodiment of the present disclosure, a method for processing white balance of an image is provided, a content of an image includes a subject, and the method may include that: a first gain for the image is calculated according to a Face Automatic White Balance (FaceAWB) algorithm configured to regulate a face in the image to a skin color; a second gain for the image is calculated according to a simple gray world algorithm; whether the first gain is similar to the second gain is determined; responsive to a determination that the first gain is similar to the second gain, white balance processing is performed on the image according to the second gain; and responsive to a determination that the first gain is not similar to the second gain, white balance processing is performed on the image according to the first gain.

In another embodiment of the present disclosure, a device for processing white balance of an image is provided, a content of an image includes a subject, and the device may include that: a calculation module configured to calculate a first gain for the image according to a FaceAWB algorithm configured to regulate a face in the image to a skin color and calculate a second gain for the image according to a simple gray world algorithm; a determination module configured to determine whether the first gain is similar to the second gain; and a processing module configured to, responsive to a determination that the first gain is similar to the second gain, perform white balance processing on the image according to the second gain, and responsive to a determination that the first gain is not similar to the second gain, perform white balance processing on the image according to the first gain.

In a third aspect, the embodiments of the disclosure provide a computer-readable storage medium having stored thereon a computer program that when executed by a processor, performs the method for processing white balance of an image in the embodiments in the first aspect.

Additional aspects and advantages of the disclosure will be partially presented in the following descriptions and partially become apparent from the following descriptions or get understood by implementing the disclosure.

BRIEF DESCRIPTION OF DRAWINGS

The abovementioned and/or additional aspects and advantages of the disclosure will become apparent and easy to understand from the descriptions made below to the embodiments in combination with the drawings, wherein.

DETAILED DESCRIPTION

Figure 1:
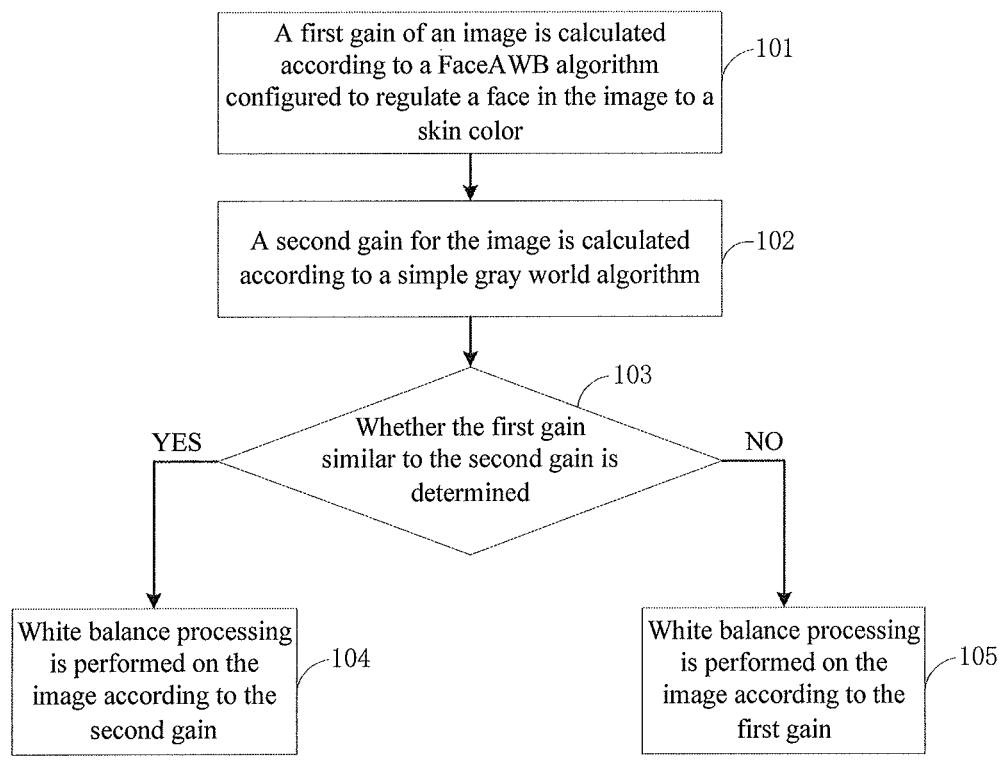
FIG. 1 is a flowchart of a method for processing white balance of an image according to an embodiment of the present disclosure.

The embodiments of the disclosure will be described below in detail. Examples of the embodiments are illustrated in the drawings. Throughout the drawings, the same or similar reference signs always represent the same or similar components or components with the same or similar functions. The following embodiments described with reference to the drawings are only exemplary and intended to explain the disclosure and should not be understood as limits to the disclosure.

The embodiments of the disclosure disclose at least the following solutions.

Solution 1. A method for processing white balance of an image, a content of an image including a face and the method including: calculating a first gain for the image according to a Face Automatic White Balance (FaceAWB) algorithm configured to regulate the face in the image to a skin color; calculating a second gain for the image according to a simple gray world algorithm; determining whether the first gain is similar to the second gain; responsive to a determination that the first gain is similar to the second gain, performing white balance processing on the image according to the second gain; and responsive to a determination that the first gain is not similar to the second gain, performing white balance processing on the image according to the first gain.

Solution 2. The method of solution 1, wherein determining whether the first gain is similar to the second gain includes: calculating a difference between the first gain and second gain for each of the color components; responsive to a determination that the difference for at least one of the color components is greater than a difference threshold, determining that the first gain is not similar to the second gain; and responsive to a determination that the difference for each of color components is less than the difference threshold, determining that the first gain is similar to the second gain.

Solution 3. The method of solution 1, wherein determining whether the first gain is similar to the second gain includes: generating a first vector according to values of the first gain for respective color components; generating a second vector according to values of the second gain for respective color components; and determining whether the first gain and second gain are similar to each other according to a vector distance between the first vector and the second vector.

Solution 4. The method of solution 3, wherein determining whether the first gain and second gain are similar to each other according to the vector distance between the first vector and the second vector includes: responsive a determination that the vector distance between the first vector and the second vector is greater than a distance threshold, determining that the first gain is not similar to the second gain; and responsive a determination that the vector distance between the first vector and the second vector is not greater than a distance threshold, determining that the first gain is similar to the second gain.

Solution 5. The method of solution 3, wherein the vector distance includes a Euclidean distance.

Solution 6. The method of solution 1, further including: before calculating a first gain for the image according to the FaceAWB algorithm configured to regulate the face in the image to a skin color, identifying a face within the image.

Solution 7. The method of solution 1, wherein calculating the first gain for the image according to the FaceAWB algorithm configured to regulate the face in the image to a skin color includes: calculating the first gain by comparing color of the face in the image and a predetermined color range for faces.

Solution 8. A device for processing white balance of an image, a content of an image including a face and the device including at least one processor executing computer readable codes to: calculate a first gain for the image according to a Face Automatic White Balance (FaceAWB) algorithm configured to regulate the face in the image to a skin color and calculate a second gain for the image according to a simple gray world algorithm; determine whether the first gain is similar to the second gain; and responsive to a determination that the first gain is similar to the second gain, perform white balance processing on the image according to the second gain, and responsive to a determination that the first gain is not similar to the second gain, perform white balance processing on the image according to the first gain.

Solution 9. The device of solution 8, wherein the at least one processor is configured to: calculate a difference between the first gain and second gain for each of color components; and responsive to a determination that the difference for at least one of the color components is greater than a difference threshold, determine that the first gain is not similar to the second gain, and responsive to a determination that the difference for each of color components is less than the difference threshold, determine that the first gain is similar to the second gain.

Solution 10. The device of solution 8, wherein the at least one processor is configured to: generate a first vector according to values of the first gain for respective color components and generate a second vector according to values of the second gain for respective color components; and determine whether the first gain and second gain are similar to each other according to a vector distance between the first vector and the second vector.

Solution 11. The device of solution 10, wherein the at least one processor is configured to: responsive a determination that the vector distance between the first vector and the second vector is greater than a distance threshold, determining that the first gain is not similar to the second gain; and responsive a determination that the vector distance between the first vector and the second vector is not greater than a distance threshold, determining that the first gain is similar to the second gain.

Solution 12. The device of solution 10, wherein the vector distance includes a Euclidean distance.

Solution 13. The device of solution 8, wherein the at least one processor is configured to: before calculating a first gain for the image according to the FaceAWB algorithm configured to regulate the face in the image to a skin color, identifying a face within the image.

Solution 14. The device of solution 8, wherein the at least one processor is configured to: calculate the first gain by comparing color of the face in the image and a predetermined color range for faces.

Solution 15. A non-transitory computer-readable storage medium having stored thereon a computer program that when executed by a processor, performs the method for processing white balance of an image, the method including: calculating a first gain for the image according to a Face Automatic White Balance (FaceAWB) algorithm configured to regulate the face in the image to a skin color; calculating a second gain for the image according to a simple gray world algorithm; determining whether the first gain is similar to the second gain; responsive to a determination that the first gain is similar to the second gain, performing white balance processing on the image according to the second gain; and responsive to a determination that the first gain is not similar to the second gain, performing white balance processing on the image according to the first gain.

Solution 16. The non-transitory computer-readable storage medium of solution 15, wherein determining whether the first gain is similar to the second gain includes: calculating a difference between the first gain and second gain for each of the color components; responsive to a determination that the difference for at least one of the color components is greater than a difference threshold, determining that the first gain is not similar to the second gain; and responsive to a determination that the difference for each of color components is less than the difference threshold, determining that the first gain is similar to the second gain.

Solution 17. The non-transitory computer-readable storage medium of solution 15, wherein determining whether the first gain is similar to the second gain includes: generating a first vector according to values of the first gain for respective color components; generating a second vector according to values of the second gain for respective color components; and determining whether the first gain and second gain are similar to each other according to a vector distance between the first vector and the second vector.

Solution 18. The non-transitory computer-readable storage medium of solution 17, wherein determining whether the first gain and second gain are similar to each other according to the vector distance between the first vector and the second vector includes: responsive a determination that the vector distance between the first vector and the second vector is greater than a distance threshold, determining that the first gain is not similar to the second gain; and responsive a determination that the vector distance between the first vector and the second vector is not greater than a distance threshold, determining that the first gain is similar to the second gain.

Solution 19. The non-transitory computer-readable storage medium of solution 17, wherein the vector distance includes a Euclidean distance.

Solution 20. The non-transitory computer-readable storage medium of solution 15, further including: before calculating a first gain for the image according to the FaceAWB algorithm configured to regulate the face in the image to a skin color, identifying a face within the image.

Solution 21. The non-transitory computer-readable storage medium of solution 15, wherein calculating the first gain for the image according to the FaceAWB algorithm configured to regulate the face in the image to a skin color includes: calculating the first gain by comparing color of the face in the image and a predetermined color range for faces.

Solution 22. A terminal equipment, including one or more of the following components: a casing and a processor, memory and camera located in the casing, wherein the memory stores executable program codes, and the processor reads the executable program codes stored in the memory to run a program corresponding to the executable program code to execute the method for processing white balance of an image of any one of solutions 1-7.

A method, device and terminal equipment of the embodiments of the present disclosure will be described below with reference to the drawings.

FIG. 1 is a flowchart of a method for processing white balance of an image according to an embodiment of the disclosure. The content of the image includes for example a subject. The subject may be a face, animal, sky, scenery, or the like. As illustrated in FIG. 1, the method includes the following operations.

In block 101, a first gain of an image is calculated according to a Face Automatic White Balance (FaceAWB) algorithm configured to regulate a face in the image to a skin color.

The FaceAWB algorithm refers that an image characteristic is required to be reasonably estimated when the image is processed by using a white balance method, thereby estimating a corrector more appropriately. When a person exists in the image, since the change in the skin color for a race is small and within an estimable range, a corresponding corrector may be determined according to a characteristic of a face skin color to further obtain a more accurate white balance calculation result. Particularly under a large-area pure color background and/or mixed light condition, a white balance effect of the image may be effectively improved. For selecting a suitable gain to perform white balance processing on the image, the first gain for the image may be calculated for later use according to the FaceAWB algorithm.

In block 102, a second gain for the image is calculated according to a simple gray world algorithm.

The simple gray world algorithm takes a gray world hypothesis as a basis. The hypothesis refers to that, for an image with lots of color changes, a mean value of saturation of three components Red (R), Green (G), and Blue (B) tends to be a same gray value G. That is, there is made such a hypothesis in the simple gray world algorithm that a mean value of mean reflection of light is generally a constant value and saturation of the three components R, G and B of the constant value tend to be consistent. When a large of colors exist in the image, processing the image by using the simple gray world algorithm can effectively eliminate influence of environmental light. For selecting a suitable gain to perform white balance processing on the image, the second gain for the image may be calculated for later use according to the simple gray world algorithm.

In block 103, whether the first gain is similar to the second gain is determined.

In a possible example, a difference between the first gain and the second gain is calculated for each of color components. Responsive to a determination the difference of at least one of the color components is greater than a difference threshold, it may be determined that the first gain is not similar to the second gain. Responsive to a determination that the difference of each of color components is less than the difference threshold, it may be determined that the first gain is similar to the second gain.

In another possible example, a first vector is generated according to values of the first gain for each color components. A second vector is generated according to values of the second gain for each color components. Whether the first gain and second gain are similar is determined according to a vector distance between the first vector and the second vector. In a process of determining whether the first gain and second gain are similar to each other according to the vector distance between the first vector and the second vector, responsive a determination that the vector distance between the first vector and the second vector is greater than a distance threshold, it may be determined that the first gain is not similar to the second gain. When the vector distance between the first vector and the second vector is not greater than the distance threshold, it may be determined that the first gain is similar to the second gain. In this embodiment, the vector distance includes a Euclidean distance.

In block 104, responsive to a determination that the first gain is similar to the second gain, the white balance processing is performed on the image according to the second gain.

In this embodiment of the present disclosure responsive to a determination that the first gain is similar to the second gain, it is indicated that an environment where the image is shot is not under a large-area pure color and/or mixed light condition, the second gain calculated by using the simple gray world algorithm is more accurate, and under this circumstance, if the first gain calculated by using the FaceAWB algorithm is adopted to process the image, a white balance shift may be brought to influence the white balance effect instead. Therefore, under the circumstance that the first gain is similar to the second gain, white balance processing may be performed on the image according to the second gain to achieve a better white balance effect.

In block 105, responsive to a determination that the first gain is not similar to the second gain, white balance processing is performed on the image according to the first gain.

In this embodiment of the present disclosure, responsive to a determination that the first gain is not similar to the second gain, it is indicated that the environment where the image is shot is in the large-area pure color and/or mixed light condition. Under this circumstance, a practical environment is inconsistent with the simple gray world hypothesis is based on, and if the second gain calculated by using the simple gray world algorithm is adopted to process the image, it is difficult to accurately correct a color of the image. Since a change in a face skin color is small, influence of the large-area pure color and/or mixed light condition may be effectively avoided. Therefore, under the circumstance that the first gain is not similar to the second gain, white balance processing may be performed on the image according to the first gain calculated by using the FaceAWB algorithm to achieve a batter white balance effect.

From the above, in the embodiment of the present disclosure, the first gain for the image is calculated according to the FaceAWB algorithm configured to regulate the face in the image to the skin color. The second gain for the image is calculated according to the simple gray world algorithm. Whether the first gain is similar to the second gain is determined. Responsive to a determination that the first gain is similar to the second gain, white balance processing is performed on the image according to the second gain. Responsive to a determination that the first gain is not similar to the second gain, white balance processing is performed on the image according to the first gain. Therefore, a more effective white balance algorithm may be adopted to process the image for different scenarios, the white balance algorithm may be highly matched with the practical scenario, and a white balance processing effect is further improved.

Figure 2:
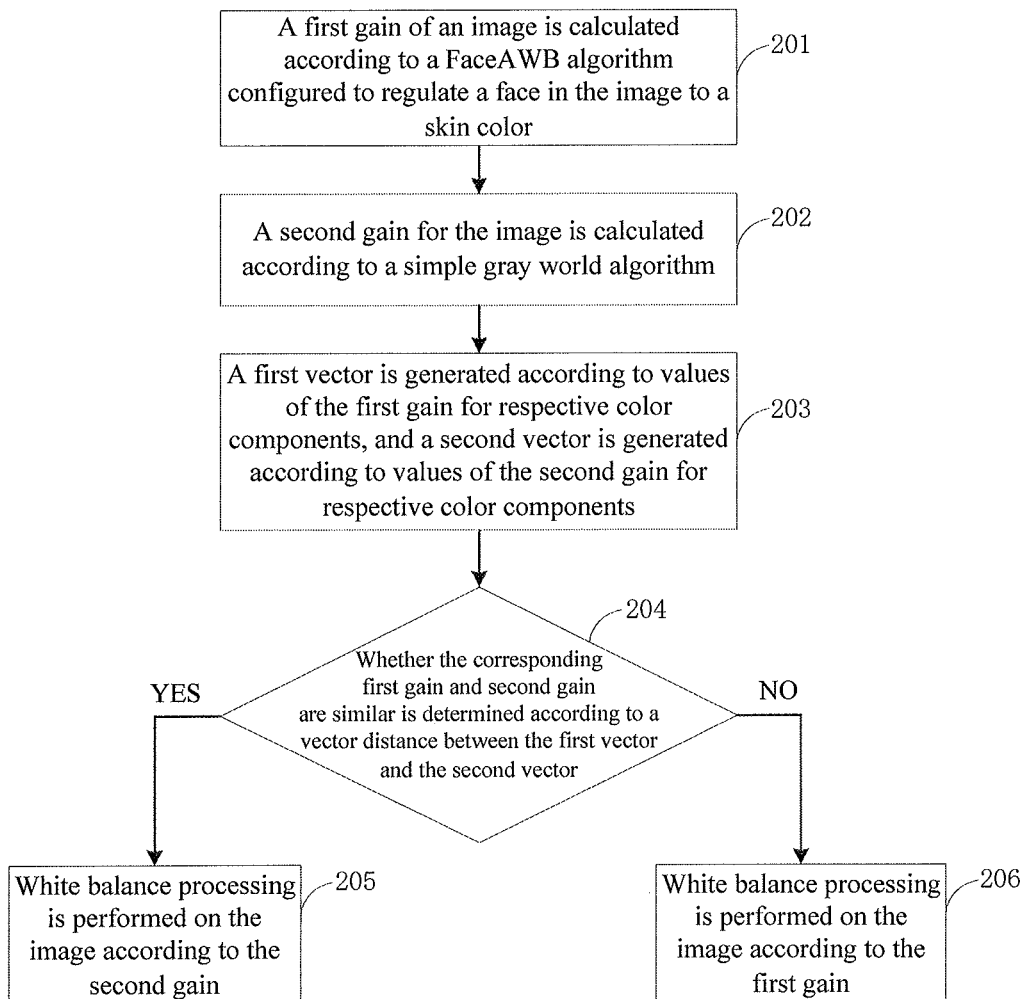
FIG. 2 is a flowchart of another method for processing white balance of an image according to another embodiment of the present disclosure.

FIG. 2 is a flowchart of another method for processing white balance of an image according to another embodiment of the present disclosure. As illustrated in FIG. 2, the method includes the following operations.

In block 201, a first gain of an image is calculated according to a FaceAWB algorithm configured to regulate a face in the image to a skin color.

The face in the image may be recognized by using a face recognition technology to obtain a coordinate interval of a face region at first. For example, an Adaboost algorithm may be adopted for face recognition, and other algorithms capable of rapidly recognizing the face region may also be adopted to recognize a region of interest, such as a face region. There are no limits made to a corresponding face recognition implementation manner in the embodiment.

After the face region is obtained, since the change in the skin color for a race is small, statistics show that, for example, after an RGB color space of the skin color is converted to a YCbCr space, a Cb range of the face is [133, 173], and a Cr range of the face is [77, 127]. That is, the image may be corrected according to the skin color range, as long as a skin color range of a person may be determined. Therefore, the first gain for the image may be calculated by comparing a color of the face region in the image with a preset skin color range.

In block 202, a second gain for the image is calculated according to a simple gray world algorithm.

The hypothesis of the simple gray world algorithm is based on that: for an image with lots of color changes, a mean value of saturations of three components R, G, and B tends to be the same gray value G. During a practical application, there are usually two methods for determining the gray value G. In a possible implementation, a constant value may be adopted. For example, a half of a largest gray value may be adopted, that is, when the largest gray value is 255, the gray value G may be 128. As another possible implementation, a mean value of color R in the image is calculated, a mean value of color G in the image is calculated, and a mean value of color B in the image is calculated, and a mean value of the three mean values is adopted as the gray value G. After the gray value G is determined, the gray value G may be compared with the mean value of the color component R, the gray value G may be compared with the mean value of the color component G, and the gray value G may be compared with the mean value of the color component B, thereby calculating the second gain for the image. This algorithm is simple and rapid.

In block 203, a first vector is generated according to values of the first gain for each color components, and a second vector is generated according to values of the second gain for each color components.

During the practical application, the first gain and the second gain may be accurately characterized by using vectors of color spaces. There may be various kinds of color spaces, for example, the RGB color space, i.e., a color space based on three primary colors of equipment. In addition, it may also be a Hue, Saturation and Intensity (HSI) color space, and the HSI color space describes colors with hue, saturation or chroma, and intensity or brightness from a human visual system. The HSI color space may be described with a conical space model. Of course, another color space may also be adopted for description and no more elaborations will be made in the embodiment. In a possible implementation, an RGB model in the color space may be adopted to represent the first gain and the second gain.

In the RGB model, each color appears in three color components R, G, and B, the model is based on a cartesian coordinate system, and the considered color space is a cube. A vertex of the cube may be taken as a base point, black is located at the base point, and white is located at a vertex farthest away from the base point in the cube. In the model, different colors are located on the cube or located inside the cube and may be characterized by using vectors distributed from the base point. In a possible implementation, if all the colors are normalized, the cube is a unit cube, that is, all the R, G, and B are valued within a range of [0, 1]. Therefore, the first gain and the second gain on each color component in R, G, and B may also be valued within the range of [0, 1]. The value of the first gain on each color component may be combined together to generate the first vector, and the value of the second gain on each color component may be combined together to generate the second vector. For example, if the value of the first gain on the component R is 0.1, the value on the component G is 0.2, and the value on the component B is 0.3, the first vector [0.1, 0.2, 0.3] may be generated according to the value of the first gain on each color components. If the value of the second gain on the component R is 0.2, the value on the component G is 0.2, and the value on the component B is 0.2, the second vector [0.2, 0.2, 0.2] may be generated according to the value of the second gain on each color component.

In block 204, whether the first gain and second gain area similar according to a vector distance between the first vector and the second vector.

After the first vector and the second vector are generated, quantitative characterization of the first gain and the second gain is implemented. When the vector distance between the first vector and the second vector is calculated, a Euclidean distance may be adopted to describe the vector distance between the two vectors, and a manner such as a cosine distance and a Pearson correlation coefficient may also be adopted to describe the vector distance between the two vectors. For example, if the Euclidean distance is adopted to describe the vector distance between the first vector and the second vector, through the following Euclidean distance formula:

$$d(x,y)=\sqrt{(x_R-y_R)^2+(x_G-y_G)^2+(x_B-y_B)^2},$$

the vector distance between the first vector and the second vector may be calculated. Here, $d(x,y)$ is the vector distance between the first vector and the second vector, $x_R$ is the value on the color component R in the first vector, $x_G$ is the value on the color component G in the first vector and $x_B$ is the value on the color component B in the first vector, and $y_R$ is the value on the color component R in the second vector, $y_G$ is the value on the color component G in the second vector and $y_B$ is the value on the color component B in the second vector.

After the vector distance between the first vector and the second vector is calculated, whether the vector distance between the first vector and the second vector is greater than a distance threshold may be determined, and if the vector distance between the first vector and the second vector is greater than the distance threshold, it may be determined that the first gain is not similar to the second gain. If the vector distance between the first vector and the second vector is not greater than the distance threshold, it may be determined that the first gain is similar to the second gain.

In block 205, responsive to a determination that the first gain is similar to the second gain, white balance processing is performed on the image according to the second gain.

In this embodiment of the present disclosure, responsive to a determination that the first gain is similar to the second gain, it is indicated that there are sufficient scenery reflection surfaces in the image and reflection spectrums are balanced. White balance processing may be accurately performed on the image by using the second gain calculated by using the simple gray world algorithm. Under this circumstance, if the first gain calculated by using the FaceAWB algorithm, a white balance shift may be brought to influence a white balance effect instead.

In block 206, responsive to a determination that the first gain is not similar to the second gain, white balance processing is performed on the image according to the first gain.

In this embodiment of the present disclosure, responsive to a determination that the first gain is not similar to the second gain, it is indicated that the environment where the image is shot may be under a large-area pure color and/or mixed light condition. Under this circumstance, a practical environment is inconsistent with the simple gray world hypothesis is based on, and it is difficult to accurately perform white balance processing on the image by using the second gain calculated by using the simple gray world algorithm. Therefore, under this circumstance, the FaceAWB algorithm is used to effectively improve a white balance processing result to achieve a better shooting effect.

From the above, in the embodiment of the present disclosure, after the first gain for the image is calculated according to the FaceAWB algorithm configured to regulate the face in the image to the skin color and the second gain for the image is calculated according to the simple gray world algorithm, the first vector may be generated according to the value of the first gain on each color component and the second vector may be generated according to the value of the second gain on each color component; whether the first gain and second gain are similar to each other is determined according to the vector distance between the first vector and the second vector; responsive to a determination that the first gain is similar to the second gain, white balance processing is performed on the image according to the second gain; and responsive to a determination that the first gain is not similar to the second gain, white balance processing is performed on the image according to the first gain. Therefore, the FaceAWB algorithm is adopted only in a special scenario of large-area pure color and/or mixed light and the like and is not adopted in a simple scenario with balanced reflection spectrums, advantages of the FaceAWB algorithm are further effectively reflected, and meanwhile, negative effects of the FaceAWB algorithm in part of scenarios are effectively avoided.

Figure 3:
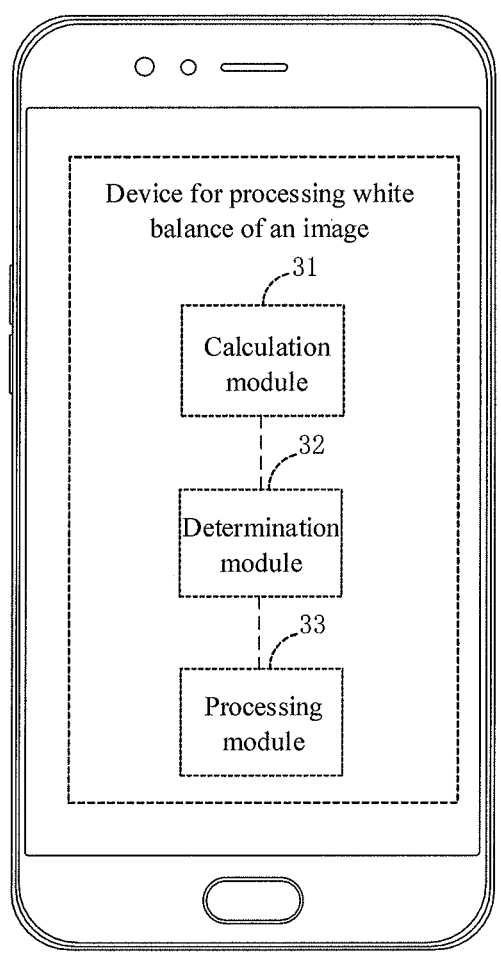
FIG. 3 is a schematic diagram illustrating configuration of a device for processing white balance of an image according to an embodiment of the present disclosure.

To implement the abovementioned embodiment, the present disclosure further discloses a device for processing white balance of an image. FIG. 3 is a schematic diagram illustrating configuration of a device for processing white balance of an image according to an embodiment of the present disclosure. As illustrated in FIG. 3, the device for processing white balance of an image includes: a calculation module 31, a determination module 32, and a processing module 33.

The calculation module 31 is configured to calculate a first gain of an image according to a FaceAWB algorithm configured to regulate a face in the image to a skin color and calculate a second gain for the image according to a simple gray world algorithm.

The determination module 32 is configured to determine whether the first gain is similar to the second gain.

The processing module 33 is configured to, responsive to a determination that the first gain is similar to the second gain, perform white balance processing on the image according to the second gain, and responsive to a determination that the first gain is not similar to the second gain, perform white balance processing on the image according to the first gain.

It is to be noted that the abovementioned descriptions about the method embodiment are also applied to the device of the embodiment of the present disclosure and an implementation principle is similar and will not be elaborated herein.

In the device for processing white balance of an image of the embodiment, the calculation module is configured to calculate the first gain for the image according to the FaceAWB algorithm configured to regulate the face in the image to the skin color and calculate the second gain for the image according to the simple gray world algorithm; the determination module is configured to determine whether the first gain is similar to the second gain; and the processing module is configured to, responsive to a determination that the first gain is similar to the second gain, perform white balance processing on the image according to the first gain, and responsive to a determination that the first gain is not similar to the second gain, perform white balance processing on the image according to the second gain. The technical problem that a white balance algorithm is selected in a user setting manner to easily mismatch the white balance algorithm with a practical scenario and deteriorate a white balance processing effect is solved.

Figure 4:
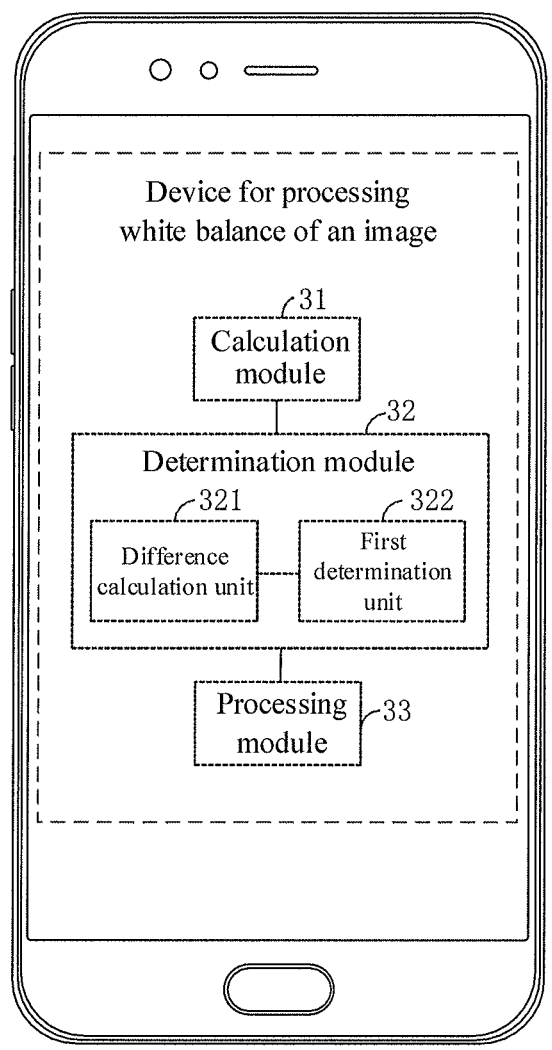
FIG. 4 is a schematic diagram illustrating configuration of another device for processing white balance of an image according to an embodiment of the present disclosure.

On the basis of the abovementioned embodiment, FIG. 4 is a schematic diagram illustrating configuration of another device for processing white balance of an image according to another embodiment of the present disclosure. As illustrated in FIG. 4, on the basis of FIG. 3, the determination module 32 in the device for processing white balance of an image includes: a difference value unit 321, and a first determination unit 322.

The difference value unit 321 is configured to calculate a difference value between a corresponding first gain and a corresponding second gain for each color component.

The first determination unit 322 is configured to, responsive to a determination that the difference for at least one of the color components is greater than a difference threshold, determine that the first gain is not similar to the second gain, and responsive to a determination that the difference for each of color components is less than the difference threshold, determine that the first gain is similar to the second gain.

Figure 5:
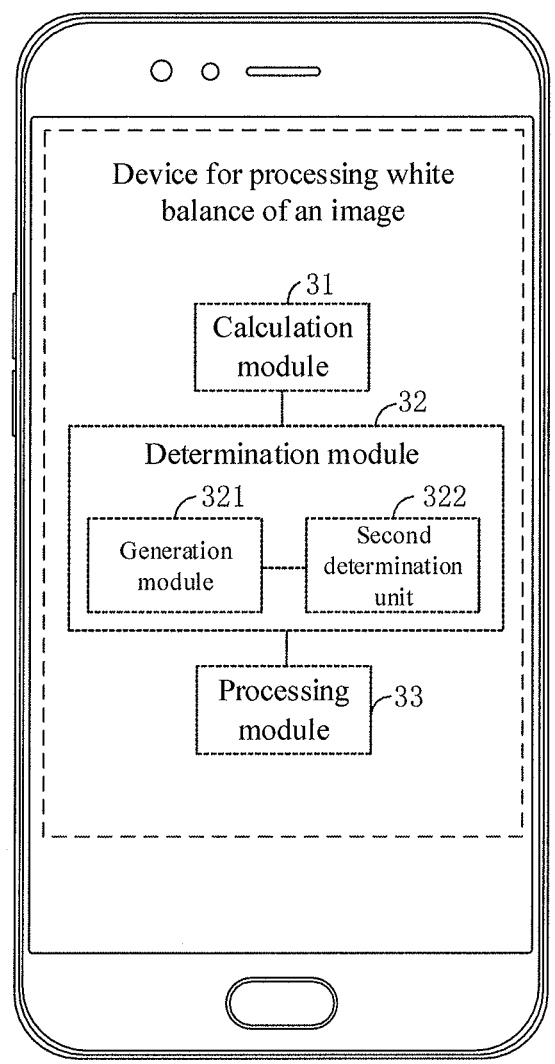
FIG. 5 is a schematic diagram illustrating configuration of another device for processing white balance of an image according to another embodiment of the present disclosure.

On the basis of the abovementioned embodiment, FIG. 5 is a schematic diagram illustrating configuration of another device for processing white balance of an image according to another embodiment of the present disclosure. As illustrated in FIG. 5, on the basis of FIG. 3, the determination module 32 in the device for processing white balance of an image includes: a generation unit 323 and a second determination unit 324.

The generation unit 323 is configured to generate a first vector according to values of the first gain for respective color components and generate a second vector according to values of the second gain for respective color components.

The second determination unit 324 is configured to determine whether the first gain and second gain are similar to each other according to a vector distance between the first vector and the second vector.

It is to be noted that the abovementioned descriptions about the method embodiment are also applied to the device of the embodiment of the present disclosure and an implementation principle is similar and will not be elaborated herein.

In the device for processing white balance of an image of the embodiment, the calculation module is configured to calculate the first gain for the image according to the FaceAWB algorithm configured to regulate the face in the image to the skin color and calculate the second gain for the image according to the simple gray world algorithm; the determination module is configured to determine whether the first gain is similar to the second gain; and the processing module is configured to, responsive to a determination that the first gain is similar to the second gain, perform white balance processing on the image according to the second gain, and responsive to a determination that the first gain is not similar to the second gain, perform white balance processing on the image according to the first gain. The technical problem that a white balance algorithm is selected in a user setting manner to easily mismatch the white balance algorithm with a practical scenario and deteriorate a white balance processing effect is solved.

Figure 6:
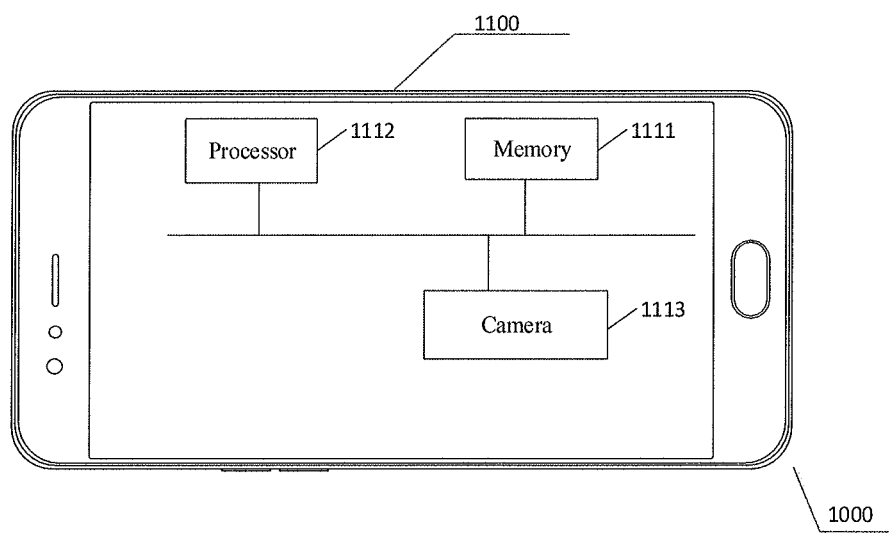
FIG. 6 is a schematic diagram illustrating configuration of a terminal equipment according to an embodiment of the present disclosure.

To implement the abovementioned embodiment, the present disclosure further discloses terminal equipment. FIG. 6 is a schematic diagram illustrating configuration of terminal equipment according to an embodiment of the present disclosure. As illustrated in FIG. 6, the terminal equipment 1000 includes: a casing 1100 and a camera 1113, memory 1114 and processor 1115 located in the casing.

Here, the memory 1114 stores an executable program code; and the processor 1115 reads the executable program code stored in the memory 1114 to run a program corresponding to the executable program code to execute the method for processing white balance of an image of the abovementioned embodiment.

It is to be noted that the abovementioned descriptions about the white balance processing method embodiment are also applied to the terminal equipment 1000 of the embodiment of the present disclosure and an implementation principle is similar and will not be elaborated herein.

From the above, the terminal equipment of the embodiment of the present disclosure calculates the first gain for the image according to the FaceAWB algorithm configured to regulate the face in the image to the skin color, calculates the second gain for the image according to the simple gray world algorithm, determines whether the first gain is similar to the second gain, responsive to a determination that the first gain is similar to the second gain, performs white balance processing on the image according to the second gain, and responsive to a determination that the first gain is not similar to the second gain, performs white balance processing on the image according to the first gain. The technical problem that a white balance algorithm is selected in a user setting manner to easily mismatch the white balance algorithm with a practical scenario and deteriorate a white balance processing effect is solved.

In the descriptions of the specification, descriptions with reference to terms "an embodiment", "some embodiments", "example", "specific example", "some examples" or the like refer to that specific characteristics, structures, materials or features described in combination with the embodiment or the example are included in at least one embodiment or example of the present disclosure. In the specification, schematic expressions about the terms are not always made for the same embodiment or example. In addition, specific described characteristics, structures, materials or features may be combined in any one or more embodiments or examples in a proper manner. Moreover, those skilled in the art may combine and integrate different embodiments or examples described in the specification and characteristics of different embodiments or examples without conflicts.

Although the embodiments of the present disclosure have been illustrated or described above, it can be understood that the embodiments are exemplary and should not be understood as limits to the present disclosure and those of ordinary skilled in the art may make variations, modifications, replacements and transformations to the embodiments within the scope of the present disclosure.

The invention claimed is:

1. A method for processing white balance of an image, a content of an image comprising a subject and the method comprising:
    calculating a first gain for the image according to a Face Automatic White Balance (FaceAWB) algorithm configured to regulate a face in the image to a skin color;
    calculating a second gain for the image according to a simple gray world algorithm;
    determining whether the first gain is similar to the second gain;
    responsive to a determination that the first gain is similar to the second gain, performing white balance processing on the image according to the second gain; and
    responsive to a determination that the first gain is not similar to the second gain, performing white balance processing on the image according to the first gain.

2. The method as claimed in claim 1, wherein determining whether the first gain is similar to the second gain comprises:
    calculating a difference between the first gain and second gain for each of the color components;
    responsive to a determination that a difference for at least one of the color components is greater than a difference threshold, determining that the first gain is not similar to the second gain; and
    responsive to a determination that a difference for each of color components is less than the difference threshold, determining that the first gain is similar to the second gain.

3. The method as claimed in claim 1, wherein determining whether the first gain is similar to the second gain comprises:
    generating a first vector according to values of the first gain for each color components;
    generating a second vector according to values of the second gain for each color components; and
    determining whether the first gain and second gain are similar to each other according to a vector distance between the first vector and the second vector.

4. The method as claimed in claim 3, wherein determining whether the first gain and second gain are similar to each other according to the vector distance between the first vector and the second vector comprises:
    responsive a determination that the vector distance between the first vector and the second vector is greater than a distance threshold, determining that the first gain is not similar to the second gain; and
    responsive a determination that the vector distance between the first vector and the second vector is not greater than a distance threshold, determining that the first gain is similar to the second gain.

5. The method as claimed in claim 3, wherein the vector distance comprises a Euclidean distance.

6. The method as claimed in claim 1, before calculating a first gain for the image according to the FaceAWB algorithm configured to regulate the face in the image to a skin color, further comprising:
identifying the subject within the image.

7. The method as claimed in claim 1, wherein calculating the first gain for the image according to the FaceAWB algorithm configured to regulate the subject in the image to a skin color comprises:
calculating the first gain by comparing color of the face in the image and a predetermined color range for faces.

8. A device for processing white balance of an image, a content of an image comprising a subject and the device comprising at least one processor executing computer readable codes to:
calculate a first gain for the image according to a Face Automatic White Balance (FaceAWB) algorithm configured to regulate a face in the image to a skin color and calculate a second gain for the image according to a simple gray world algorithm;
determine whether the first gain is similar to the second gain; and
responsive to a determination that the first gain is similar to the second gain, perform white balance processing on the image according to the second gain, and responsive to a determination that the first gain is not similar to the second gain, perform white balance processing on the image according to the first gain.

9. The device as claimed in claim 8, wherein the at least one processor is configured to:
calculate a difference between the first gain and second gain for each of color components; and
responsive to a determination that the difference for at least one of the color components is greater than a difference threshold, determine that the first gain is not similar to the second gain, and responsive to a determination that the difference for each of color components is less than the difference threshold, determine that the first gain is similar to the second gain.

10. The device as claimed in claim 8, wherein the at least one processor is configured to:
generate a first vector according to values of the first gain for respective color components and generate a second vector according to values of the second gain for respective color components; and
determine whether the first gain and second gain are similar to each other according to a vector distance between the first vector and the second vector.

11. The device as claimed in claim 10, wherein the at least one processor is configured to:
responsive a determination that the vector distance between the first vector and the second vector is greater than a distance threshold, determining that the first gain is not similar to the second gain; and
responsive a determination that the vector distance between the first vector and the second vector is not greater than a distance threshold, determining that the first gain is similar to the second gain.

12. The device as claimed in claim 10, wherein the vector distance comprises a Euclidean distance.

13. The device as claimed in claim 8, wherein the at least one processor is configured to: before calculating a first gain for the image according to the FaceAWB algorithm configured to regulate the face in the image to a skin color, identifying a face within the image.

14. The device as claimed in claim 8, wherein the at least one processor is configured to:
calculate the first gain by comparing color of the face in the image and a predetermined color range for faces.

15. A non-transitory computer-readable storage medium having stored thereon a computer program that when executed by a processor, performs the method for processing white balance of an image, a content of an image comprising a subject the method comprising:
calculating a first gain for the image according to a Face Automatic White Balance (FaceAWB) algorithm configured to regulate a face in the image to a skin color;
calculating a second gain for the image according to a simple gray world algorithm;
determining whether the first gain is similar to the second gain;
responsive to a determination that the first gain is similar to the second gain, performing white balance processing on the image according to the second gain; and
responsive to a determination that the first gain is not similar to the second gain, performing white balance processing on the image according to the first gain.

16. The non-transitory computer-readable storage medium as claimed in claim 15, wherein determining whether the first gain is similar to the second gain comprises:
calculating a difference between the first gain and second gain for each of the color components;
responsive to a determination that the difference for at least one of the color components is greater than a difference threshold, determining that the first gain is not similar to the second gain; and
responsive to a determination that the difference for each of color components is less than the difference threshold, determining that the first gain is similar to the second gain.

17. The non-transitory computer-readable storage medium as claimed in claim 15, wherein determining whether the first gain is similar to the second gain comprises:
generating a first vector according to values of the first gain for respective color components;
generating a second vector according to values of the second gain for respective color components; and
determining whether the first gain and second gain are similar to each other according to a vector distance between the first vector and the second vector.

18. The non-transitory computer-readable storage medium as claimed in claim 17, wherein determining whether the first gain and second gain are similar to each other according to the vector distance between the first vector and the second vector comprises:
responsive a determination that the vector distance between the first vector and the second vector is greater than a distance threshold, determining that the first gain is not similar to the second gain; and
responsive a determination that the vector distance between the first vector and the second vector is not greater than a distance threshold, determining that the first gain is similar to the second gain.

19. The non-transitory computer-readable storage medium as claimed in claim 17, wherein the vector distance comprises a Euclidean distance.

20. The non-transitory computer-readable storage medium as claimed in claim 15, before calculating a first gain for the image according to the FaceAWB algorithm configured to regulate the face in the image to a skin color, further comprising:

identifying a subject within the image.

* * * * *